(12) United States Patent
Babitch

(10) Patent No.: US 9,225,438 B2
(45) Date of Patent: Dec. 29, 2015

(54) SYSTEM-LEVEL ADAPTIVE MINIMIZATION OF INTERFERENCE IN MULTI-FUNCTION RADIOS

(75) Inventor: Daniel Babitch, San Jose, CA (US)

(73) Assignee: CSR Technology Inc., Sunnyvale, CA (US)

( * ) Notice: Subject to any disclaimer, the term of this patent is extended or adjusted under 35 U.S.C. 154(b) by 161 days.

(21) Appl. No.: 13/616,495

(22) Filed: Sep. 14, 2012

(65) Prior Publication Data

US 2014/0080427 A1 Mar. 20, 2014

(51) Int. Cl.
*H04B 1/44* (2006.01)
*H04B 15/04* (2006.01)

(52) U.S. Cl.
CPC ...................................... *H04B 15/04* (2013.01)

(58) Field of Classification Search
CPC ... H04W 72/082; H04W 24/02; H04W 88/06; H04W 52/243; H04W 52/367
USPC ............... 455/63.1, 67.11, 78, 452.2, 447
See application file for complete search history.

(56) References Cited

U.S. PATENT DOCUMENTS

| | | | |
|---|---|---|---|
| 7,330,697 B1* | 2/2008 | Bolt et al. | 455/63.1 |
| 8,000,660 B1 | 8/2011 | Woleben et al. | |
| 2007/0183338 A1* | 8/2007 | Singh et al. | 370/252 |
| 2009/0296785 A1* | 12/2009 | Wu et al. | 375/132 |
| 2011/0237188 A1 | 9/2011 | Sen | |
| 2011/0237246 A1* | 9/2011 | Sen | 455/426.1 |

FOREIGN PATENT DOCUMENTS

GB 24498800 7/2013

OTHER PUBLICATIONS

Search Report for GB Appln. No. 1308296.1, dated Feb. 10, 2014.

* cited by examiner

*Primary Examiner* — Yuwen Pan
*Assistant Examiner* — Fatuma Sherif
(74) *Attorney, Agent, or Firm* — Mahamedi Paradice LLP

(57) ABSTRACT

A method and apparatus that mitigates self-interference among various receivers and transmitters in a multifunction radio includes a transmitter operating in a first frequency band and a receiver operating in a second frequency band, different from the first frequency band. Jamming factors for multiple frequency channels in the first frequency band are calculated based on possible interference with the second frequency band by artifacts of the respective frequency channels. The frequency channel having the smallest jamming factor is selected as the frequency to be used by the transmitter.

20 Claims, 4 Drawing Sheets

SYSTEM-LEVEL ADAPTIVE MINIMIZATION OF INTERFERENCE IN MULTI-FUNCTION RADIOS

BACKGROUND

The present invention concerns multi-function radios and in particular methods and apparatus for mitigating self-interference among functions performed by multi-function radios.

The ability to combine multiple radio frequency (RF) functions with signal processing and computational functions has resulted in a demand for robust personal communications/entertainment/information devices. Mobile telephones typically include more than just a telephone or even a portable computer. They may include multiple functions, for example, a GSM or CDMA mobile telephone, a GPS receiver, a Bluetooth® receiver/transmitter (RX/TX) an MP3 player, a WiFi Rx/Tx and a low-power FM RX/TX to allow Internet or MP3 content to be played over an FM radio.

SUMMARY

An example embodiment of the present invention includes a method for mitigating self-interference among various receivers and transmitters in a multifunction radio. The radio includes a transmitter operating in a first frequency band and a receiver operating in a second frequency band, different from the first frequency band. Jamming factors for multiple frequency channels in the first frequency band are calculated based on possible interference with the second frequency band by artifacts of the respective frequency channels. The frequency channel having the smallest jamming factor is selected as the frequency to be used by the transmitter.

BRIEF DESCRIPTION OF THE DRAWING

The invention may be understood from the following detailed description when read in connection with the accompanying drawing. It is emphasized, according to common practice, that various features of the drawing may not be to scale. On the contrary, the dimensions of the various features may be arbitrarily expanded or reduced for clarity. Moreover, in the drawing, common numerical references are used to represent like features. Included in the drawing are the following figures.

DETAILED DESCRIPTION

The increasing number of functions in hand-held personal communications/entertainment/information devices increases the possibility of one function interfering with the operation of another. For example, a multi-function radio can have self-jamming from one transmitter to another receiver, and also possibly inadvertent jamming from a local broadcast station to a channel which is desired to be used as a low-power short range link. It is helpful to select the best transmission and reception frequencies, when possible, to minimize such interference. In some cases, it may be desirable to request user intervention to set the frequency of some external device. It is not a good strategy, however, to force the user to figure out a good channel location with total free choice and no guiding information. It is better to measure and calculate the best arrangement of frequency and either automatically set the desired frequency plan or, if that is not possible, to advise the user as to what frequency or frequencies may be selected.

One example embodiment of the invention includes an interference avoidance scheme that knows the various components of its multi-radio chip and their sensitive frequency bands. It examines the existing spectra, notes the desired functions, and controls the various receivers and transmitters that are in use to implement a frequency plan having relatively low interference among the receivers and transmitters. The proposed method attempts to minimize interference—even when it cannot be eliminated—by choosing the best compromise plan.

Figure 1:
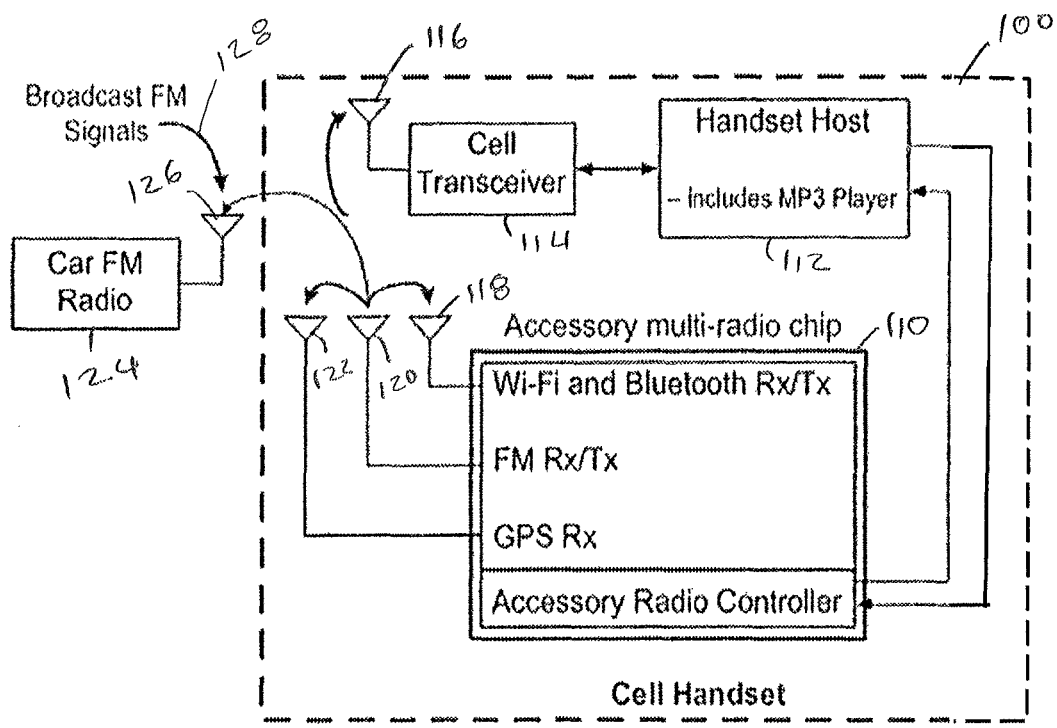
FIG. 1 is a block diagram of a mobile telephone including a multiple function radio chip.
Figure 1A:
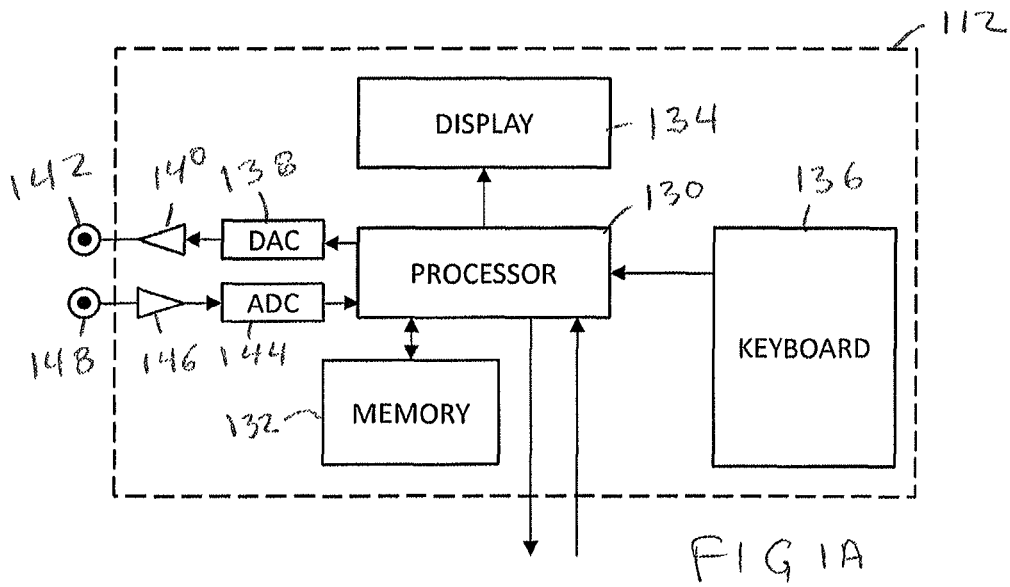
FIG. 1A is a block diagram of a handset host suitable for use in the mobile telephone shown in FIG. 1

FIG. 1 is a block diagram of an example multi-function accessory radio in a cell handset. The device includes a multi-radio chip 110, a handset host 112 and a cell transceiver 114. Details of the handset host 112 are shown in FIG. 1A. The exemplary host includes a processor 130, memory 132, display 134 and keyboard 136. In addition, the processor may be coupled via a digital to analog converter (DAC) 138 and amplifier 140 to an audio output 142 and via an ADC 144 and amplifier 146 to an audio input port 148. The handset host includes software that controls the cell transceiver 114 to implement cellular telephone functions and controls the multi-function radio chip 110 to implement, for example, the WiFi, Bluetooth, GPS and FM radio functions. In addition, the host 112 includes software to run applications downloaded, for example, via the Cell Transceiver 114 or WiFi RX of the multi-function radio chip 110, including, in the example system, an MP3 player.

The multifunction radio chip includes receivers and transmitters for WiFi, Bluetooth and FM radio and a GPS receiver. The WiFi and Bluetooth RX/TX operate in the 2.4-2.5 GHz ISM band. The frequency band for the FM RX/TX is between 87 and 108 MHz and for GPS it is between 1565 and 5185 MHz. In addition, the example cellular RX/TX uses two frequency bands between 1820 and 1830 MHz and between 1835 and 1845 MHz. In the illustrated example the user wishes to talk on the cell phone while listening to an MP3 music file on his car radio. The audio signal from the MP3 player is modulated onto an FM carrier signal and sent from the handset to the car radio 124 wirelessly by means of a low power FM signal generated by the FM TX of the multi-function radio chip 110. For this example the user also wants use the GPS RX to provide navigation instructions.

The problem with this example scenario is shown by the curved lines between antennas 116, 118, 120, 122 and 126 in FIG. 1. The line between antenna 120 and 126 represents the low-power FM signal that the user wants to send to the car radio. The other lines represent undesirable interference between the FM signal and the other receiver functions. The arrow 128 represents undesirable interference between a local FM broadcast signal and the low-power FM signal generated by the multi-radio chip 110.

As shown by the arrows between antenna 120 and each of the antennas 116, 118 and 122, the handset FM Tx signal has harmonics which may interfere with the cell radio and the GPS. Furthermore, the handset FM harmonics might also interfere with Bluetooth and Wi-Fi, should they be used concurrently with the other functions. Higher order intermodulation products (not shown) between two transmitted signals or poorly filtered modulation products (not shown) generated during the modulation of a carrier with a baseband signal can also cause cross-interference among all radios.

The problem of Wi-Fi and Bluetooth coexistence is addressed in the Adaptive Frequency Hopping (AFH) protocols defined in the Bluetooth specification. This system identifies sub-bands of the ISM band that are being used for Wi-Fi transmissions and sets the Bluetooth hopping frequencies to avoid these sub-bands.

One way in which interference between the FM Tx signal the other signals may be prevented would be to allow only one Tx signal at a time from the handset. That works if the handset FM Tx can be placed where FM Broadcast is small. This, however, greatly reduces the functionality of the handset.

The exemplary handset unit 100 includes a more sophisticated method of coordination which allows multiple simultaneous handset functions and which operates to reduce cross-functional interference. The example method employs both frequency avoidance and weighting of importance for the various receivers. In this example the system adjusts the FM Tx frequency based on a number of factors including, calculations of interference into the desired Rx frequencies such as cell and GPS, the frequencies and powers of FM Broadcast frequencies, the spectral sensitivity characteristics of the various Rx signals, and the relative importance of the various radios.

The FM Tx function is used to play music from an MP3 player through automobile radio speakers when the user is riding in a car. The FM Tx and Rx frequencies are in the region of 76 to 108 MHz. Harmonics of the FM Tx may act as jamming signals for the cell Rx, the GPS and the 2.4 GHz ISM Band (Bluetooth and Wi-Fi) Rx functions. In addition, the FM Tx low-power signal may legally be placed on a frequency which is occupied by a strong commercial FM broadcast transmitter, and if that frequency is used, then the car radio reception of the MP3 player signal would be degraded by the simultaneous presence of a strong broadcast signal.

A low-power FM transmitter presents special problems in a multi-function radio because of its low frequency (from 76 to 108 MHz) compared to all the other radios. Harmonics of the FM Tx signal may fall into the Rx bands of other radios. It is costly to filter the FM Tx harmonics well enough to effectively remove them from the bands used by the other radios. Other methods of interference mitigation such as frequency avoidance or minimization of interference by frequency placement for best-compromise performance, may be applied, in addition to modest filtering, for the best performance and lowest cost system.

The FM Tx can automatically be set to this frequency and the system can advise the user, for example, via the display 134, shown in FIG. 1A, to tune the car radio to that frequency in order to pick up the MP3 music signal. As an alternative to the displayed message, the advice could be given to the user via a synthesized voice message from the audio output port 142. This method could also be used to automatically adapt the Bluetooth frequency hopping sequence to avoid any FM Tx harmonics that may be in the ISM band. Additionally, the channel selection advice can be periodically refreshed as the spectrum may change with time when the user travels to other locations. Additionally the channel selection advice may be changed if the position of the device 100 changes significantly after the previous determination of the FM Rx spectrum.

Figure 2:
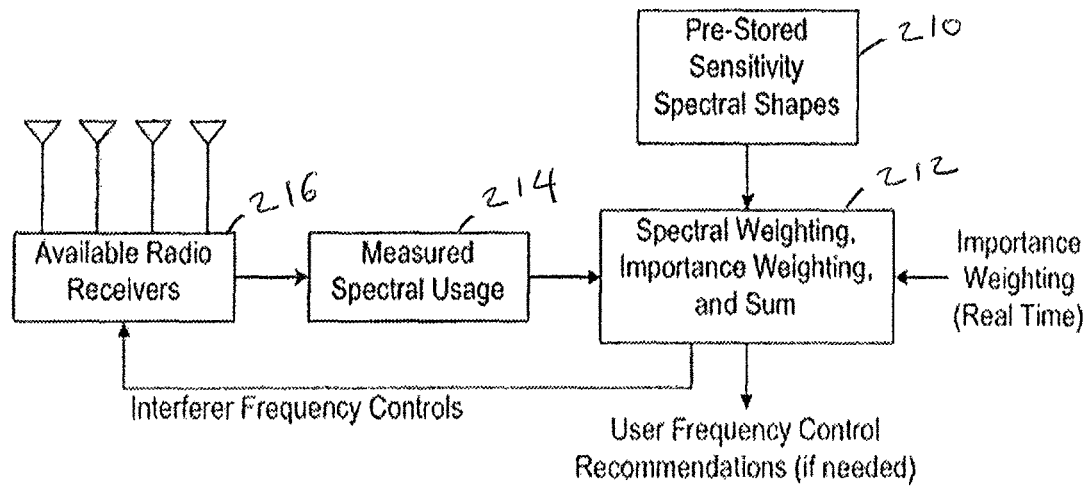
FIG. 2 is a block diagram of circuitry suitable for use with the multi-function radio chip shown in FIG. 1.

FIG. 2 is a functional block diagram of an example system that implements a frequency avoidance scheme. The system shown in FIG. 2 may be implemented in the Accessory Radio Controller of the multi-radio chip 110, shown in FIG. 1 and/or in the processor 130 of the Handset Host, shown in FIG. 1A. the system includes a process 212 that analyzes the spectra of the various signals, using pre-stored spectral sensitivity data 210, importance weighting values and measured spectral usage 214 to produce frequency control data for the radio receivers 216 and either a control signal or control recommendations for the radio transmitters (not shown in FIG. 2).

Many algorithms which satisfy the system block diagram of FIG. 2 are possible. One example is shown in FIG. 7 with reference to the frequency graphs shown in FIGS. 3-6. This example describes an algorithm in which the frequency of the FM Tx signal is selected to avoid harmonics that may interfere with the WiFi, Bluetooth and GPS signals. The steps of the algorithm could be repeated for other transmit signals having harmonics that may interfere with these signals. In addition, interference between the FM Tx signal and the ISM band used by Bluetooth and WiFi is not addressed in the example. Interference between the FM Tx signal and the ISM band may be easily accommodated, however, by adding the 2.4-2.5 GHz ISM band as a sensitive band.

Although the example embodiments of the invention concern interference due to harmonics, other artifacts of the RF modulation, such as poorly filtered sidebands or intermodulation products of multiple transmitters can also be considered when calculating the jamming factor for a particular frequency used by a particular radio.

Figure 5:
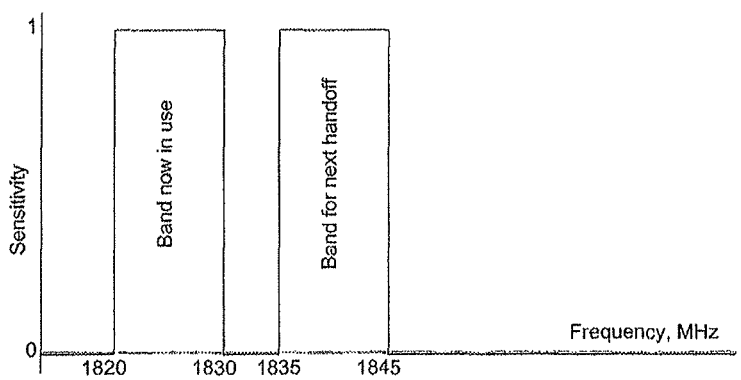
Figure 6:
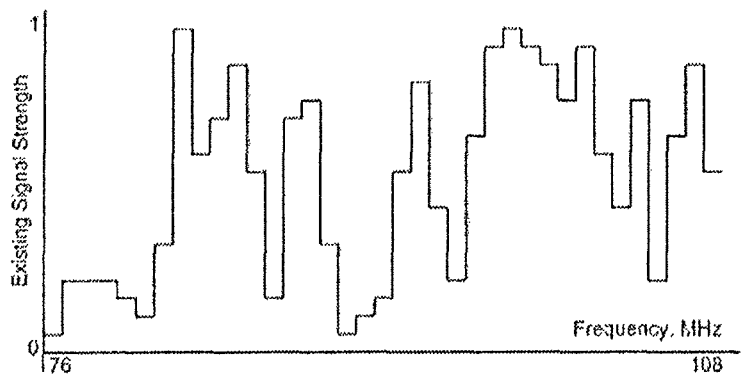
FIG. 6 is a signal power graph illustrating an example FM spectrum.
Figure 7:
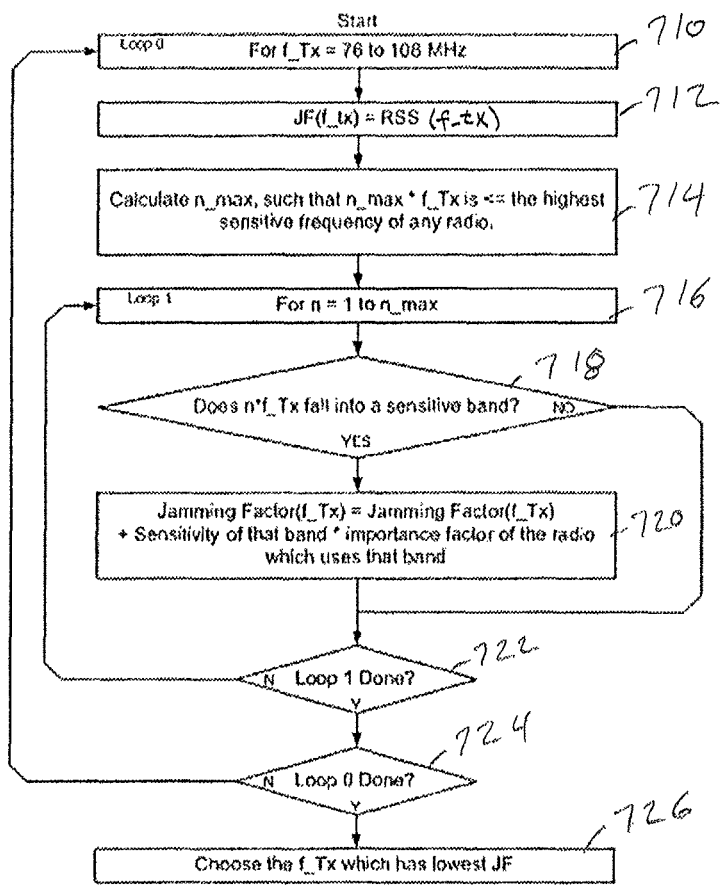
FIG. 7 is a flow-chart diagram that is useful for describing the operation of a system according to the subject invention.

The example algorithm takes into account the GPS band (FIGS. 3 and 4), the GSM band (FIG. 5) and the FM band (FIG. 6). In a general case every available radio would have a sensitivity spectrum. If any radio is not in use then its sensitivity spectrum would be zero at all frequencies.

Figure 3:
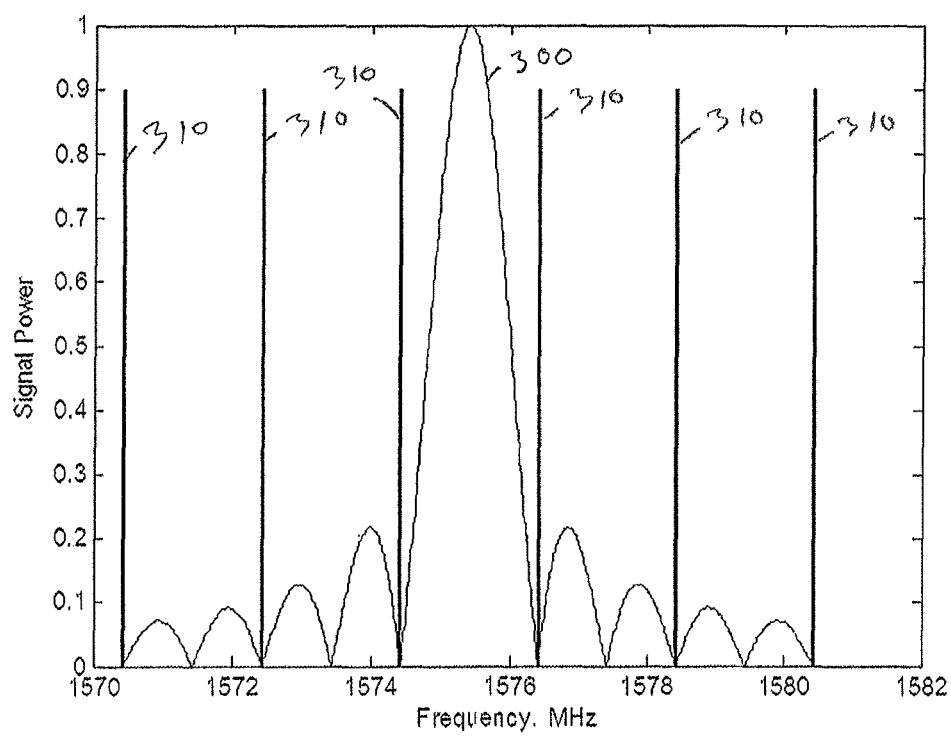
FIG. 3 is a graph of signal power versus frequency for a GPS signal that is useful for describing the operation of the invention.

The frequency selection process 212 operates using a pre-stored sensitivity spectrum for each of the receivers. Each spectrum may indicate that the entire frequency range used by the respective receiver is not to be used or it may indicate that interferers at specific frequencies inside the frequency range may be permitted. For example, FIG. 3 is a sensitivity diagram of the GPS Rx signal. The curve 300 represents the energy distribution of the GPS signal. As shown by this curve, the GPS signal has very low energy at the frequencies 310. Thus, a fixed-frequency harmonic of the FM Tx signal at any of these frequencies would not significantly affect reception of GPS signals, even though it is within the GPS band.

Figure 4:
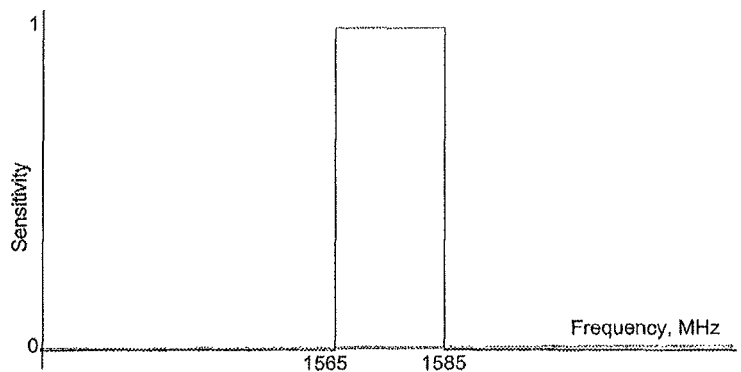
FIGS. 4 and 5 are simplified signal sensitivity graphs for a GSM signal and a GPS signal.

Although the algorithm shown in FIG. 7 may take into account such frequencies within the relevant bands, a simpler method may be to block off the entire band between 1565 and 1585 MHz as being a sensitive band for the GPS Rx signal. This graph is shown in FIG. 4. FIG. 5 shows an example sensitivity graph for a GSM signal with the band between 1820 and 1830 MHz being used for the current communication and the band between 1835 and 1845 MHz being reserved as to be used for the handoff from the current base station to the next base station.

FIG. 6 is a graph of the received signal strength (RSS) for the local FM Rx channels. In the system shown in FIG. 2, this band is provided to the process 212 by the measurement block 214. This spectrum may be measured, for example, in response to a signal from the block 212 which causes the FM receiver to scan the entire FM band while the block 214 collects the RSS data. This spectrum may change as the location of the receiver changes. If GPS is also On then the FM Broadcast Usage measurement can be repeated when the GPS location changes significantly, and/or it can be repeated at fixed time intervals to refresh the result.

The jamming sensitivities can all be partially or fully precomputed and stored as either formulas or lookup tables, or combinations thereof. In the case of channelized receivers such as cell, the shape of the sensitivity graph can be predefined and the center frequencies determined by the host controller in real-time, depending on the channel(s) being used.

The proposed algorithm, briefly, is to calculate a "Jamming Factor" (JF(f_tx)) for each possible FM Tx frequency (f_tx), choose the FM Tx frequency channel with the smallest Jamming Factor number and then set that frequency as the FM Tx frequency and advise the user to tune the car radio to that frequency.

The Jamming Factor is defined as the sum of all jamming sensitivities plus FM Rx signal strength, for every FM Tx frequency choice. An algorithm which does that is outlined in FIG. 7 below.

The higher the FM Rx signal strength, the less desirable is the channel. If all FM broadcast channels are in use, then the algorithm can direct the user to set an in-between frequency by refining the frequency steps used by the algorithm. This refinement takes into account requirements placed on the permitted FM broadcast channels in a particular geographic area. In the USA the Federal Communications Commission (FCC) assigns FM broadcast channels in a geographic area skipping every other available channel frequency to mitigate adjacent channel interference. This means assignments are made on 200 KHz intervals. However FM radios can tune on 100 KHz intervals (an FM channel). Therefore the FM Tx can be directed to a 100 KHz channel which falls in between the two FM Rx signals having the smallest combined RSS, and some measure of performance can be achieved in that way even if all normal channels are occupied.

The example interference minimization algorithm shown in FIG. 7 also takes into account the relative importance of the signals. If, for example, some radio is not being used, then its jamming sensitivity does not need to be used in the computation. Additionally the host controller may determine that it is more important to limit interference for some radios than for others. This may be a real-time determination, of course, since the use scenario may change depending on many factors. Alternatively, the algorithm may ignore this factor and treat all radios of equal importance.

The example algorithm begins at step 710 includes two loops. An outer loop which steps through each possible frequency of the FM Tx signal and an inner loop which steps through each relevant harmonic of the selected frequency to determine its contribution to the jamming factor for that frequency. The process begins at step 710 which initializes the loop that scans the FM frequency band. Next, at step 712, the process assigns the received signal strength for the current frequency, f_tx, to a variable JF(f_tx), the jamming factor for that frequency. This may be done, for example, by tuning the FM receiver of the multi-radio chip to f_tx, measuring the RSS and assigning that value to JF(f_tx). At step 714, the process determines the highest harmonic, n_max, of f_tx to be considered. This harmonic is less than or equal to the highest sensitive frequency of any radio in the multi-radio chip. It is contemplated that step 712 may be omitted from the algorithm if the proximity of the mobile device 100 to the FM radio 124 is such that the RSS of the FM signal is not a factor. In this case, the jamming factors, JG(f_tx) may be initialized to zero.

Step 716 initializes the inner loop, which adjusts JF(f_tx) for each harmonic of f_tx (n*f_tx) for n=1 to n_max. At step 718, the process determines if n*f_tx is within the sensitive band of one of the radios currently being used in the multi-radio chip. If it is, then JF(f_tx) is increased by an amount equal to the product of the sensitivity of the band times a factor representing the importance of the band.

At steps 722 and 724, the inner and outer loop variables are incremented until the loops are complete. If there are more harmonics of f_tx to be processed, step 722 branches to step 716. If there are more frequencies in the FM band to be processed, step 724 branches to step 710. At step 726, the process selects the F_tx having the lowest jamming factor as the frequency to be used to transmit the MP3 signal to the FM radio.

The example process described with reference to FIG. 7 determines which FM transmission channel should be used to provide the best transmission of the MP3 signal and to provide the least interference with the other radios that may be in use. This method may be applied more generally to select other transmission frequencies where an artifact of one of these transmission frequencies may interfere with the reception of signals in another frequency band. Selection of transmission channels for multiple frequency bands may be implemented by an iterative process by which a frequency channel in a highest frequency band and having artifacts that may interfere with reception in other frequency bands is selected first and then transmission channels for successively lower frequency bands are selected. This may be applied, for example, to select a cellular frequency band that does not interfere with frequencies in the ISM band being used by the Bluetooth or WiFi devices.

Intermodulation products and poorly filtered modulation products may occupy frequencies that are less than the frequency of the signal being tested. Depending on non-linearities in the signal processing, simultaneous transmission of two signals may produce an unwanted intermodulation product at a frequency equal to the difference between the frequencies. Similarly, the modulation of a carrier signal by a baseband signal may produce unwanted sideband signals immediately below the wanted modulated signal. These products may be addressed in a similar manner to that described above with reference to FIG. 7. Rather than producing an array of harmonic frequencies, the modified algorithm may produce an array of possible intermodulation and modulation products. These could then be checked for overlap against lower frequency bands in the same way as in FIG. 7. For example, using this technique, a set of hopping frequencies for a Bluetooth transmission may be selected with reference to a set of frequency bands to be used by the cellular transmitter so that they do not interfere with a selected FM frequency or with any frequency in the FM band. This process may be performed before or after the process shown in FIG. 7 to ensure that the FM transmission does not interfere with the Bluetooth transmission and vice-versa.

The process shown in FIG. 7 may be made more efficient by setting a threshold based on the RSS (F_tx). If this value is greater than the threshold, it is not necessary to calculate the harmonics and the inner loop can be skipped. In addition, the inner loop may be modified so that, instead of searching all of the harmonics of f_tx, it searches only the harmonics from the minimum sensitive frequency to the maximum sensitive frequency.

Although the example shown in FIG. 7 assumes that neither Bluetooth nor WiFi is in use, the frequency sensitivities of the ISM band may be taken into account using the same methods as described above. Alternatively, if the FM Tx is not being used, then this same algorithm could be used to guide the Bluetooth Tx to use a partial band as may be allowed by the Bluetooth specification for Adaptive Frequency Hopping to reduce jamming of the cell phone. In this example embodiment, the result would be the selection of the lower frequency cell phone frequency channels, higher frequency Bluetooth channels or both, based on a combination of transmission channels that produces the least interference with the various receivers that are in use.

Although the invention is illustrated and described herein with reference to specific embodiments, the invention is not intended to be limited to the details shown. Rather, various modifications may be made in the details within the scope and range of equivalents of the claims and without departing from the invention. For example, although FIG. 7 is a flow-chart diagram illustrating computer code that may be implemented in the processor 130 of FIG. 1A and/or the accessory radio controller of the multi-radio chip shown in FIG. 1, it is contemplated that the functions shown in the flow chart may be implemented in hardware as an Application Specific Integrated Circuit (ASIC) or as a Programmable Gate Array (PGA). The methods described above may also be implemented in computer software stored in a tangible medium such as a memory or optical or magnetic disk, for execution on either or both of the processor 130, shown in FIG. 1A or the accessory radio controller shown in FIG. 1.

What is claimed:

1. A method for mitigating self-interference in a device between a transmitter operating in a first frequency band and a receiver operating in a second frequency band, the method comprising:
   for each of a first plurality of channels in the first frequency band:
      initializing a jamming factor for the channel to a numerical value representing a current signal level in the channel;
      determining if an artifact produced by the transmitter operating in the channel of the first frequency band overlaps at least a portion of any of a second plurality of channels of the second frequency band; and
   for each channel of the first plurality of channels in which the artifact overlaps at least a portion of any of the second plurality of channels of the second frequency band, calculating a new numerical value of the jamming factor for the selected channel based on the current jamming factor for the channel and a numerical sensitivity value of the second frequency band;
   for each channel of the first plurality of channels in which the artifact does not overlap at least a portion of any of the second plurality of channels of the second frequency band, maintain the current numerical value of the jamming factor for the channel; and
   selecting one channel of the first plurality of channels having a smallest numerical value of the jamming factor as the channel to be used by the transmitter,
   wherein none of the first plurality of channels in the first frequency band overlaps any of the second plurality of channels of the second frequency band.

2. The method of claim 1, wherein the step of initializing the jamming factor includes:
   determining a received signal strength (RSS) for the channel; and
   initializing the jamming factor for the channel to the respective RSS value.

3. The method of claim 1, wherein the predetermined sensitivity of the second frequency band varies based on the frequency spectrum of signals in the second frequency band received by the receiver.

4. The method of claim 1, wherein the predetermined sensitivity is constant across each of the second plurality of channels of the second frequency band.

5. The method of claim 1, wherein the artifact of the channel is a modulation product of the transmitter modulating the channel with a baseband signal.

6. The method of claim 1 wherein the artifact of the channel is a harmonic frequency of the channel.

7. The method of claim 6, wherein the step of determining the frequency for the artifact of the channel that overlaps at least the portion of any of the second plurality of channels of the second frequency band includes:
   determining N harmonic frequencies of the channel where N is an integer, N times the channel frequency is less than or equal to a highest frequency in the second frequency band and (N+1) times the channel frequency is greater than the highest frequency in the second frequency band; and
   comparing each harmonic frequency of the N harmonic frequencies to the second plurality of channels in the second band of frequencies to determine if each harmonic frequency overlaps at least a portion of any of the second plurality of channels in the second frequency band.

8. The method of claim 1, wherein the device includes a further receiver operating in a third frequency band, different from the first and second frequency bands, the third frequency band having a further predetermined sensitivity and the method further includes the steps of, for each of the first plurality of channels in the first frequency band:
   determining a frequency for an artifact of the channel that overlaps at least a portion of the third frequency band; and
   calculating a new value of the jamming factor for the channel based on the current jamming factor and the sensitivity of the third frequency band.

9. The method of claim 8, wherein the device includes a further transmitter operating in the second frequency band and having a plurality of further transmission channels, and the method further includes:
   for each of the plurality of further transmission channels in the second frequency band:
      initializing a further jamming factor for the channel;
      determining a frequency for an artifact of the channel that overlaps at least a portion of the third frequency band; and
      calculating a new value of the further jamming factor for the selected channel based on the current jamming factor and the sensitivity of the third frequency band; and
   selecting one channel of the plurality of further transmission channels having a smallest jamming factor as the channel to be used by the further transmitter.

10. The method of claim 9, wherein the step of determining a frequency for the artifact of the channel includes determining an intermodulation product between respective frequencies of the transmission channel and the selected further transmission channel.

11. Apparatus comprising:
   a transmitter operating in a first frequency band including a first plurality of channels;
   a receiver operating in a second frequency band including a second plurality of channels, and having a predetermined sensitivity, wherein none of the first plurality of channels in the first frequency band overlaps an of the second plurality of channels of the second frequency band;

a processor for selecting one of the first plurality of transmission channels for use by the transmitter wherein, for each channel of the first plurality of transmission channels the processor is configured to:

initialize a jamming factor for the channel to a numerical value representing a current signal level in the channel;

determine if an artifact produced by the transmitter operating in the channel of the first frequency band overlaps at least a portion of any of the channels in the second frequency band;

for each channel of the first plurality of channels in which the artifact overlaps at least a portion of any of the second plurality of channels of the second frequency band, calculate a new numerical value of the jamming factor for the selected channel based on the current jamming factor for the channel and a numerical sensitivity value of the second frequency band;

for each channel of the first plurality of channels in which the artifact does not overlap at least a portion of any of the second plurality of channels of the second frequency band, maintain the current numerical value of the jamming factor for the channel; and wherein the processor is configured to select one channel of the first plurality of channels having a smallest numerical value of the jamming factor as the channel to be used by the transmitter.

12. The apparatus of claim 11, wherein the processor configured to initialize the jamming factor for the channel is configured to:

determine a received signal strength (RSS) for the channel; and initialize the jamming factor for each of the channel to the respective RSS value.

13. The apparatus of claim 11, wherein the predetermined sensitivity of the second frequency band varies based on the frequency spectrum of signals in the second frequency band received by the receiver.

14. The apparatus of claim 11, wherein the predetermined sensitivity is constant across each of the second plurality of channels of the second frequency band.

15. The apparatus of claim 11, wherein the artifact of the channel is a modulation product of the transmitter modulating the channel with a baseband signal.

16. The apparatus of claim 11 wherein the artifact of the channel is a harmonic frequency of the channel.

17. The apparatus of claim 16, wherein the processor is configured to determine the frequency for the artifact of the channel that overlaps at least the portion of any of the second plurality of channels of the second frequency band and the processor is configured to:

determine N harmonic frequencies of the channel where N is an integer, N times the channel frequency is less than or equal to a highest frequency in the second frequency band and (N+1) times the channel frequency is greater than the highest frequency in the second frequency band; and compare each harmonic frequency of the N harmonic frequencies to the second plurality of channels in the second band of frequencies to determine if each harmonic frequency overlaps the portion of any of the second plurality of channels in the second frequency band.

18. The apparatus of claim 11, further including:

a further receiver operating in a third frequency band, different from the first and second frequency bands, the third frequency band having a further predetermined sensitivity;

wherein, for each of the first plurality of channels in the first frequency band, the processor is further configured to:

determine a frequency for an artifact of the channel that overlaps at least a portion of the third frequency band; and calculate a new value of the jamming factor for the channel based on the current jamming factor and the sensitivity of the third frequency band.

19. The apparatus of claim 18, further including a further transmitter operating in the second frequency band and having a plurality of further transmission channels;

wherein for each of the plurality of channels in the second frequency band the processor is configured to:

initialize a further jamming factor for the channel;

determine a frequency for an artifact of the channel that overlaps at least a portion of the third frequency band; and calculate a new value of the further jamming factor for the channel based on the current jamming factor and the sensitivity of the third frequency band; and wherein the processor is further configured to select one channel of the plurality of further transmission channels having a smallest jamming factor as the channel to be used by the further transmitter.

20. The apparatus of claim 19, wherein the processor is configured to determine the frequency for the artifact of the channel by determining an intermodulation product between respective frequencies of the transmission channel and the selected further transmission channel.

* * * * *